United States Patent
Sebeni et al.

(10) Patent No.: US 11,212,790 B2
(45) Date of Patent: *Dec. 28, 2021

(54) CONTROL CHANNEL FOR UE POWER SAVING

(71) Applicant: Apple Inc., Cupertino, CA (US)

(72) Inventors: Johnson O. Sebeni, Fremont, CA (US); Yang Li, Plano, TX (US); Zhu Ji, San Jose, CA (US); Yuchul Kim, San Jose, CA (US); Wei Zeng, San Diego, CA (US); Dawei Zhang, Saratoga, CA (US); Haijing Hu, Beijing (CN); Xiangying Yang, Cupertino, CA (US); Li Su, San Jose, CA (US)

(73) Assignee: Apple Inc., Cupertino, CA (US)

( * ) Notice: Subject to any disclaimer, the term of this patent is extended or adjusted under 35 U.S.C. 154(b) by 54 days.

This patent is subject to a terminal disclaimer.

(21) Appl. No.: 16/834,908

(22) Filed: Mar. 30, 2020

(65) Prior Publication Data

US 2020/0229166 A1    Jul. 16, 2020

Related U.S. Application Data

(63) Continuation of application No. 15/923,078, filed on Mar. 16, 2018, now Pat. No. 10,609,700.

(Continued)

(51) Int. Cl.
*H04W 72/04* (2009.01)
*H04W 76/28* (2018.01)

(Continued)

(52) U.S. Cl.
CPC ..... *H04W 72/042* (2013.01); *H04W 52/0209* (2013.01); *H04W 52/0216* (2013.01); *H04W 76/28* (2018.02); *H04W 84/042* (2013.01)

(58) Field of Classification Search
CPC ......... H04W 52/0209; H04W 52/0216; H04W 72/042; H04W 76/28; H04W 84/042
See application file for complete search history.

(56) References Cited

U.S. PATENT DOCUMENTS 10,609,700 B2 *   3/2020   Sebeni ............. H04W 52/0209
2009/0264164 A1   10/2009   Chun (Continued)

FOREIGN PATENT DOCUMENTS

WO    WO2017216613 A1    12/2017

*Primary Examiner* — Kashif Siddiqui
(74) *Attorney, Agent, or Firm* — Kowert, Hood, Munyon, Rankin & Goetzel, P.C.

(57) ABSTRACT

A downlink control information (DCI), such as a blanking DCI (bDCI) message may be transmitted by a base station (e.g., eNB) and received by a mobile device (e.g., UE). The bDCI may indicate that the eNB will not transmit a subsequent DCI to the UE for a duration of time. The UE may be in continuous reception mode or connected discontinuous reception (C-DRX) mode. The UE may therefore determine to enter a sleep state or take other action. The bDCI may specify an explicit blanking duration, or an index indicating a blanking duration from a lookup table, and/or the blanking duration (and/or a blanking duration offset value) may be determined in advance, e.g., semi-statically. When the UE is in C-DRX mode, the UE may be configured such that either the sleep/wake period of the C-DRX mode or the blanking period of the bDCI may take precedence over the other.

20 Claims, 4 Drawing Sheets

Related U.S. Application Data

(60) Provisional application No. 62/520,347, filed on Jun. 15, 2017, provisional application No. 62/567,155, filed on Oct. 2, 2017.

(51) Int. Cl.
*H04W 52/02* (2009.01)
*H04W 84/04* (2009.01)

(56) References Cited

U.S. PATENT DOCUMENTS

| | | |
|---|---|---|
| 2014/0269480 A1 | 9/2014 | Han |
| 2015/0365995 A1 | 12/2015 | Tabet |
| 2016/0014697 A1 | 1/2016 | Mujtaba |
| 2017/0048829 A1 | 2/2017 | Kim |
| 2017/0099635 A1 | 4/2017 | Uchino |
| 2017/0134124 A1 | 5/2017 | Lee |
| 2017/0265136 A1 | 9/2017 | Elsayed |
| 2017/0265171 A1 | 9/2017 | Rico Alvarino |
| 2018/0107263 A1 | 4/2018 | Touboul |

\* cited by examiner

CONTROL CHANNEL FOR UE POWER SAVING

PRIORITY INFORMATION

This application is a continuation of U.S. patent application Ser. No. 15/923,078 filed Mar. 16, 2018, now U.S. Pat. No. 10,609,700, which claims priority to U.S. provisional application Ser. No. 62/520,347 titled "Control Channel for UE Power Saving," filed Jun. 15, 2017, and U.S. provisional application Ser. No. 62/567,155 titled "Control Channel for UE Power Saving," filed Oct. 2, 2017, which are all hereby incorporated by reference in their entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless communication devices, and more particularly to apparatuses, systems, and methods for providing an improved control channel for saving power for wireless communications devices.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities.

Long Term Evolution (LTE) has become the technology of choice for the majority of wireless network operators worldwide, providing mobile broadband data and high-speed Internet access to their subscriber base. LTE defines a number of downlink (DL) physical channels, categorized as transport or control channels, to carry information blocks received from the MAC and higher layers. LTE also defines three physical layer channels for the uplink (UL).

The Physical Downlink Shared Channel (PDSCH) is a DL transport channel, and is the main data-bearing channel allocated to users on a dynamic and opportunistic basis. The PDSCH carries data in Transport Blocks (TB) corresponding to a media access control protocol data unit (MAC PDU), passed from the MAC layer to the physical (PHY) layer once per Transmission Time Interval (TTI). The PDSCH is also used to transmit broadcast information such as System Information Blocks (SIB) and paging messages.

The Physical Downlink Control Channel (PDCCH) is a DL control channel that carries the resource assignment for UEs that are contained in a Downlink Control Information or Indicator (DCI) message. Multiple PDCCHs can be transmitted in the same subframe using Control Channel Elements (CCE), each of which includes nine sets of four resource elements known as Resource Element Groups (REG) or RE quadruplets. The PDCCH employs quadrature phase-shift keying (QPSK) modulation, with four QPSK symbols mapped to each REG. Furthermore, 1, 2, 4, or 8 CCEs can be used for a UE, depending on channel conditions, to ensure sufficient robustness.

The Physical Uplink Shared Channel (PUSCH) is a UL channel shared by all devices (user equipment, UE) in a radio cell to transmit user data to the network. The scheduling for all UEs is under control of the LTE base station (enhanced Node B, or eNB). The eNB uses the uplink scheduling grant (DCI format 0) to inform the UE about resource block (RB) assignment, and the modulation and coding scheme to be used. PUSCH typically supports QPSK and quadrature amplitude modulation (QAM). In addition to user data, the PUSCH also carries any control information necessary to decode the information, such as transport format indicators and multiple-in multiple-out (MIMO) parameters. Control data is multiplexed with information data prior to digital Fourier transform (DFT) spreading.

The Physical Control Format Indicator Channel (PCFICH) is a DL control channel that carries the Control Format Indicator (CFI) which includes the number of orthogonal frequency-division multiplexing (OFDM) symbols used for control channel transmission in each subframe (typically 1, 2, or 3). The 32-bit long CFI is mapped to 16 Resource Elements in the first OFDM symbol of each downlink frame using QPSK modulation.

Therefore, as indicated above, during data communication over LTE, the DL uses the physical channel PDSCH, while in UL it uses the UL channel PUSCH. As also mentioned above, these two channels convey the transport blocks of data in addition to some MAC control and system information. To support the transmission of DL and UL transport channels, Downlink Shared Channel (DLSCH) and Uplink Shared Channel (UL-SCH) control signaling is required. This control information is sent in PDCCH and it contains DL resource assignment and UL grant information. PDCCH is sent in the beginning of every subframe in the first OFDM symbols. Depending on the level of robustness and the PDCCH system capacity (numbers of users to be simultaneously served in a TTI) the NW needs to achieve, PDCCH will be transmitted in either the first 1, 2, 3, or 4 OFDM symbols of a subframe. The number of OFDM symbols used in PDCCH is signaled in PCFICH.

In current LTE/LTE-advanced, the UE monitors PDCCH from time-to-time and may perform blind decoding regardless of whether a DCI is present. A significant amount of power may be consumed in "PDCCH-only" state, e.g., after performing blind decoding when no DCI is found. Noticeable power saving can be attained if "PDCCH-only" decoding can be avoided. Although proprietary solutions have been developed to try to avoid this power waste, these introduce a cost of complexity and performance. Furthermore, methods previously proposed have focused on a UE operating in idle mode, while little attention has been given to connected modes, which consume more power than idle mode. It is therefore desirable to introduce new mechanism to facilitate UE power saving in connected modes.

SUMMARY

Embodiments described herein relate to a User Equipment (UE) device and/or a base station, and associated method for an improved control channel for UE power saving during wireless communications, e.g. during Long Term Evolution (LTE) communications and transmissions.

A downlink control information (DCI), such as a blanking DCI (bDCI) message may be transmitted by a base station (e.g., eNB) and received by a mobile device (e.g., UE). The bDCI may indicate that the eNB will not transmit DL data to the UE for a duration of time, while the UE is in continuous reception mode or connected discontinuous reception (C-DRX) mode. The UE may therefore determine to enter a sleep state or take other action. The bDCI may specify an explicit blanking duration, or an index indicating a blanking duration from a lookup table, and/or the blanking duration (and/or a blanking duration offset value) may be determined in advance, e.g., semi-statically. When the UE is in C-DRX mode, the UE may be configured such that either the sleep/wake period of the C-DRX mode or the blanking period of the bDCI may take precedence over the other.

A method is disclosed for controlling downlink monitoring. According to the disclosed method, a user equipment device (UE) may receive, from a base station, on a downlink channel, a downlink control message indicating that the base station will not transmit data to the UE for a duration of time. The UE may discontinue monitoring of the downlink channel for the duration of time, wherein the discontinuing monitoring is in response to receiving the downlink control message.

The downlink control message may comprise a field explicitly indicating the duration of time. For example, the field may explicitly indicate a number of subframes for which the duration of time will last. Alternatively, the downlink control message may comprise an index identifying a value in a predetermined set of possible durations of time. Or, the downlink control message may indicate the start of the duration of time, wherein the length of the duration of time is know prior to receiving the downlink control message.

The UE may enter a sleep state for at least a portion of the duration of time, in response to receiving the downlink control message.

The UE may resume monitoring of the downlink channel in response to expiration of the duration of time.

At the time the downlink control message is received, the UE may be operating according to a continuous reception mode. Alternatively, the UE may be operating according to a C-DRX mode. In some scenarios, the UE may resume monitoring of the downlink channel at the start of the first C-DRX on cycle following the start of the duration of time. Alternatively, the duration of time may extend beyond the start of a C-DRX on cycle.

The downlink control message may be received in physical resources dedicated to a plurality of UEs comprising the UE, wherein the downlink control message indicates that the base station will not transmit data to any of the UEs in the plurality of UEs for the duration of time.

The downlink channel may be a Physical Downlink Control Channel (PDCCH), and the downlink control message may be comprised in a Downlink Control Information (DCI) message. Specifically, the downlink control message may be comprised in a Bandwidth Part (BWP) selection field of the DCI message. The downlink control message may further indicate a BWP configuration to be used by the UE upon resuming monitoring of the downlink channel. A current BWP period may be paused during the duration of time, such that slots occurring during the duration of time are not counted in a current BWP period.

An apparatus is disclosed, comprising a memory storing program instructions, and a processor communicatively coupled to the memory. The processor may be configured to execute the program instructions to cause the apparatus to perform steps according to the method described above.

A non-transitory computer-readable memory medium is disclosed, storing software instructions that are executable by a UE to cause the UE to perform steps according to the method described above.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Figure 1:
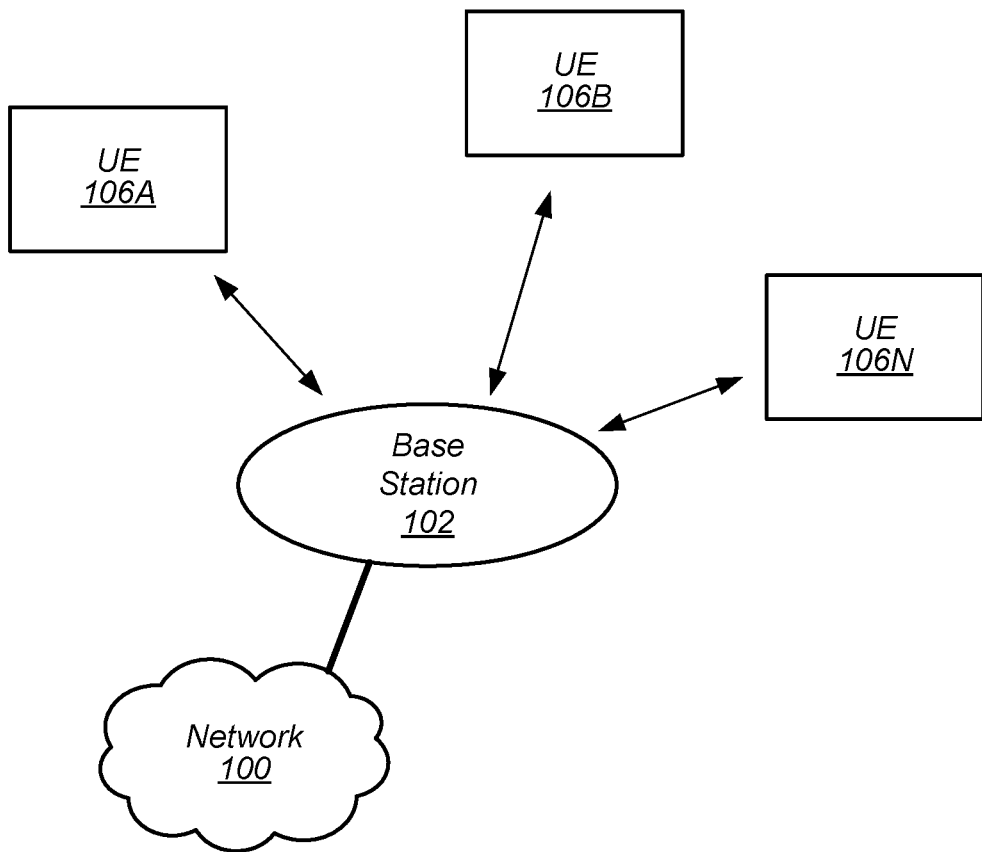
FIG. 1 illustrates an exemplary (and simplified) wireless communication system according to one set of embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

bDCI: Blanking Dowling Control Information
BS: Base Station
CCE: Control Channel Elements
C-DRX: Connected Discontinuous Reception
CFI: Control format Indicator
DCI: Downlink Control Information
DL: Downlink (from BS to UE)
DLSCH: Downlink Shared Channel
DRX: Discontinuous Reception
GPS: Global Positioning System
GSM: Global System for Mobile Communication
LTE: Long Term Evolution
MAC: Media Access Control (layer)
MIMO: Multiple-In Multiple-Out
NW: Network
OFDM: Orthogonal Frequency-Division Multiplexing
PCFICH: Physical Control Format Indicator Channel
PDCCH: Physical Downlink Control Channel
PDSCH: Physical Downlink Shared Channel PDU: Protocol Data Unit
PUSCH: Physical Uplink Shared Channel
PHY: Physical (Layer)
QPSK: Quadrature Phase-Shift Keying
REG: Resource Element Group
RRC: Radio Resource Control
RX: Reception
TTI: Transmission Time Interval
TX: Transmission
UE: User Equipment
UL: Uplink (from UE to BS)
ULSCH: Uplink Shared Channel
UMTS: Universal Mobile Telecommunication System Terms The following is a glossary of terms that may appear in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-transitory memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

DCI—refers to downlink control information. There are various DCI formats used in LTE in PDCCH (Physical Downlink Control Channel). The DCI format is a predefined format in which the downlink control information is packed/formed and transmitted in PDCCH. Throughout the present disclosure, any method or procedure referring to DCI may apply to a DCI as presently defined by 3GPP, or as may be adapted by 3GPP in future versions of any applicable standard; and may also be extended to apply to other applicable control messages (e.g., messages serving a same or similar function), even if such other applicable control messages do not strictly comply with an established format for a DCI message as defined by 3GPP. In particular, the present disclosure proposes improvements over previously defined DCI formats; such improved control messages are expressly intended to fall within the scope of the term "DCI" as used herein.

Figure 2:
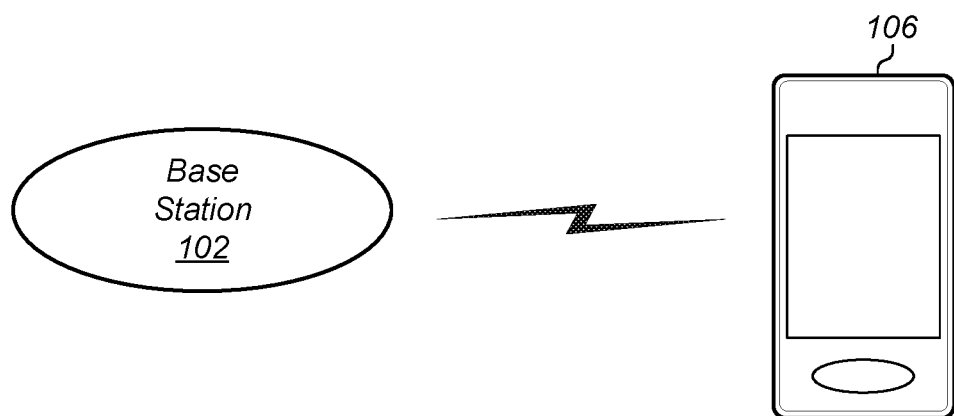
FIG. 2 illustrates a base station in communication with a wireless user equipment (UE) device according to one set of embodiments.

FIGS. 1 and 2—Communication System

FIG. 1 illustrates an exemplary (and simplified) wireless communication system. It is noted that the system of FIG. 1 is merely one example of a possible system, and embodiments may be implemented in any of various systems, as desired. As shown, the exemplary wireless communication system includes a base station 102 which communicates over a transmission medium with one or more user devices 106A through 106N. Each of the user devices may be referred to herein as a "user equipment" (UE) or UE device. Thus, the user devices 106A-106N are referred to as UEs or UE devices. Furthermore, when referring to an individual UE in general, user devices are also referenced herein as UE 106 or simply UE.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1×RTT, 1×EV-DO, HRPD, eHRPD), Wi-Fi, WiMAX etc. In some embodiments, the base station 102 communicates with at least one UE using improved PCFICH decoding techniques as disclosed herein.

UE 106 may be capable of communicating using multiple wireless communication standards. For example, a UE 106 might be configured to communicate using either or both of a 3GPP cellular communication standard (such as LTE-A) or a 3GPP2 cellular communication standard (such as a cellular communication standard in the CDMA2000 family of cellular communication standards). In some embodiments, the UE 106 may be configured to communicate with base station 102 according to improved PCFICH decoding methods as described herein. Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 may also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary system in which user equipment 106 (e.g., one of the devices 106A through 106N) is in communication with the base station 102. The UE 106 may be a device with wireless network connectivity such as a mobile phone, a hand-held device, a wearable device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments of improved decoding of PCFICH described herein, or any portion of any of the method embodiments of improved decoding of PCFICH described herein. The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT, and separate radios for communicating using each of Wi-Fi and BLUETOOTH™. Other configurations are also possible.

Figure 3:
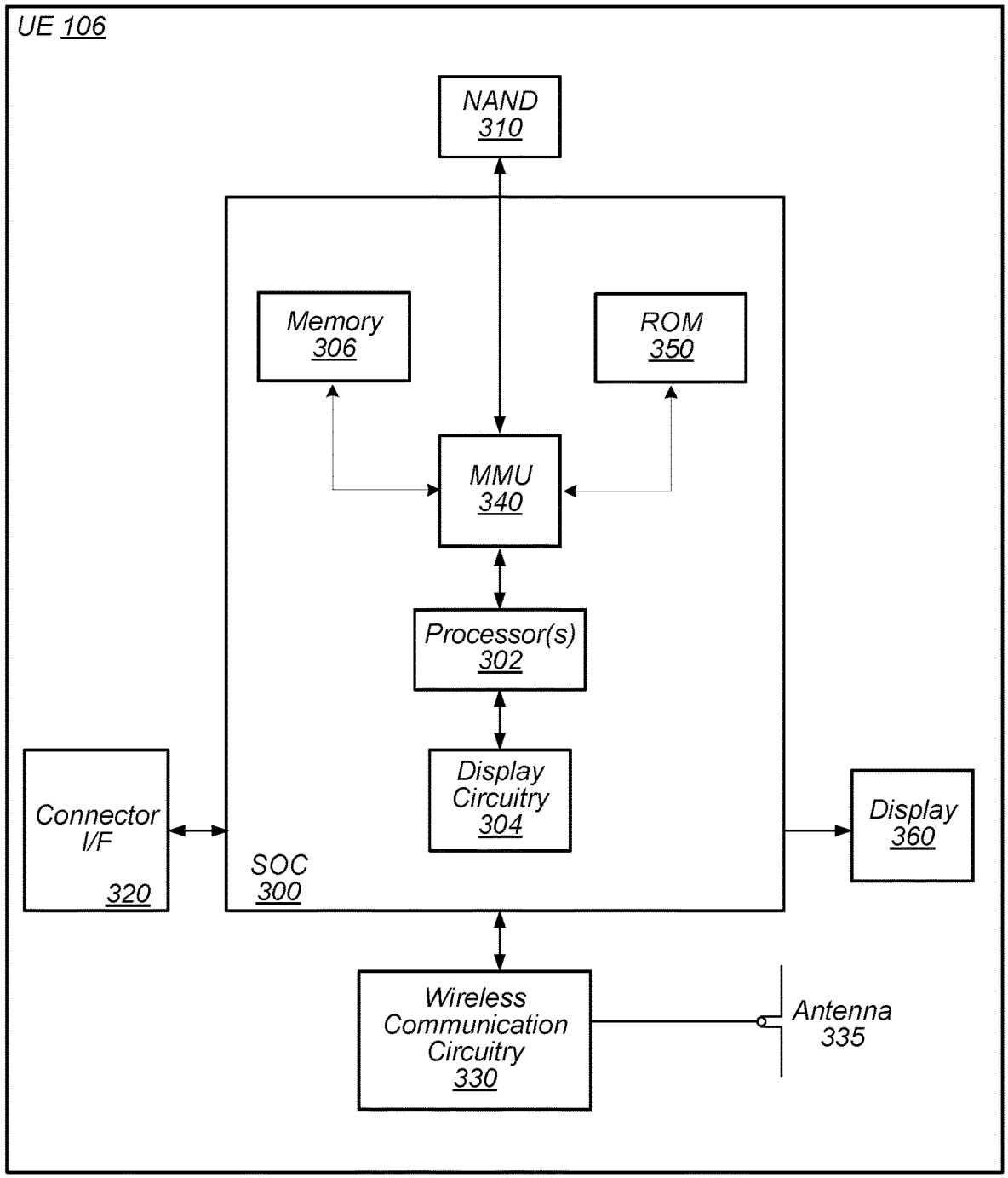
FIG. 3 illustrates an exemplary block diagram of a UE, according to one set of embodiments.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector interface (I/F) 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector I/F 320 (e.g., for coupling to the computer system), the display 360, and wireless communication circuitry 330 (e.g., for LTE, LTE-A, CDMA2000, BLUETOOTH™, Wi-Fi, GPS, etc.). The UE device 106 may include at least one antenna 335, and possibly multiple antennas 335, for performing wireless communication with base stations and/or other devices. For example, the UE device 106 may use antenna(s) 335 to perform the wireless communication. As noted above, the UE may be configured to communicate wirelessly using multiple wireless communication standards in some embodiments.

As described further subsequently herein, the UE 106 (and base station 102) may include hardware and software components for implementing a method for implementing an improved control channel for power savings during wireless communications. The processor 302 of the UE device 106 may be configured to implement part or all of the methods for implementing the improved control channel, as described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Furthermore, processor 302 may be coupled to and/or may interoperate with other components, such as wireless communication circuitry 330, as shown in FIG. 3, to implement the improved control channel according to various embodiments disclosed herein.

In some embodiments, wireless communication circuitry 330 may include one or more additional processor(s) or processor elements, and a memory storing software instructions for execution by the additional processor(s). The software instructions, when executed, may cause the UE 106 to implement the improved control channel according to various embodiments disclosed herein.

Figure 4:
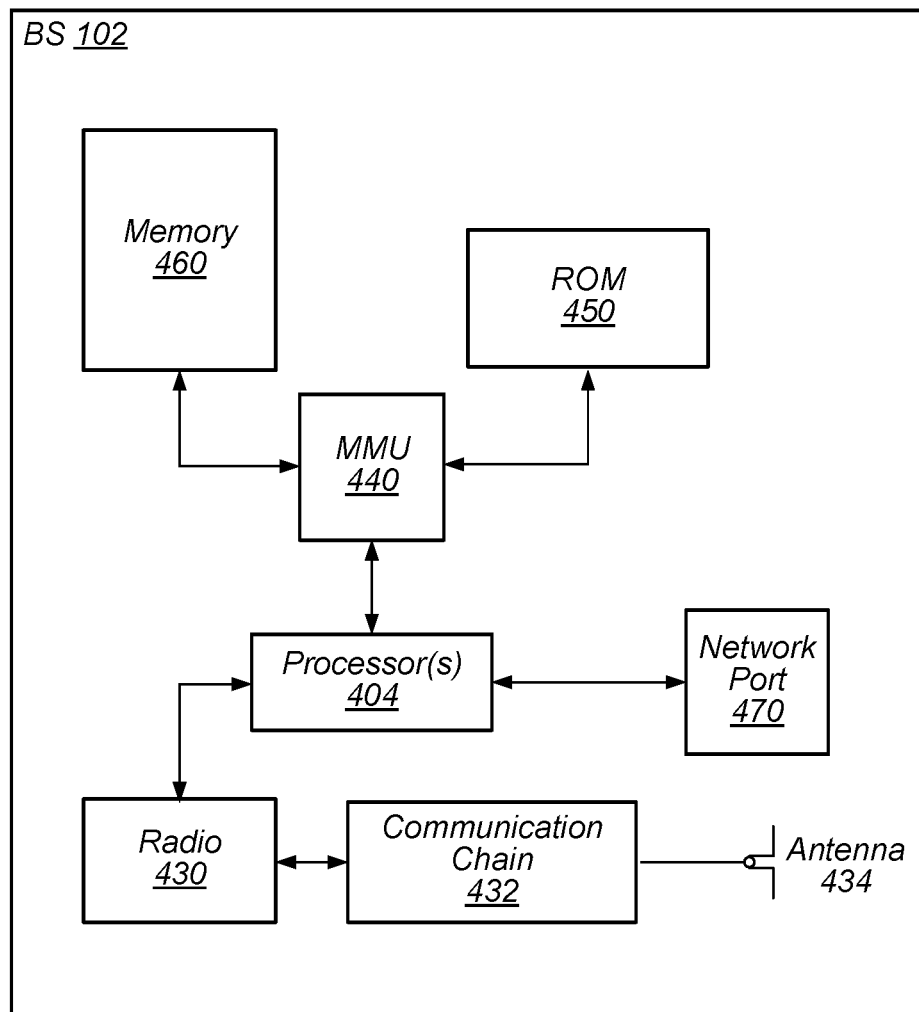
FIG. 4 illustrates an exemplary block diagram of a base station according to one set of embodiments.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 102 may also be coupled to memory management unit (MMU) 440, which may be configured to receive addresses from the processor(s) 102 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider). The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas 434. The antenna(s) 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A WCDMA, CDMA2000, etc. The processor 404 of the base station 102 may be configured to implement part or all of the methods described herein for improved decoding of PCFICH, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Overall, the various components (460, 450, 440, 404, 430, 432, 470 and 434) of BS 102 may interoperate to implement at least part or all of the methods described herein for improved decoding of PCFICH.

Improved Control Channel for Continuous Reception

A UE, such as the UE 106, while in continuous reception mode (e.g., as defined by LTE-A or other applicable standards promulgated by 3GPP or other standards bodies), may receive from a base station (e.g., an eNB), such as the base station 102, a compact DCI, e.g., a blanking DCI (bDCI), which may indicate a duration of time during which the UE may forego monitoring a control channel (e.g., the PDCCH). Thus, the UE will not expect to receive further DCIs or perform communications associated with a DCI during this blanking duration. For example, if the UE DL buffer is empty and the UE is in continuous reception mode, or is otherwise expected to continue monitoring the control channel, then the eNB may transmit to the UE a bDCI indicating that the eNB will not transmit a subsequent DCI or associated DL data to the UE for a certain duration. Specifically, the indicated blanking duration may be a longer time than the UE would otherwise expect to go without receiving a transmission from the eNB. For example, the blanking period may extend over a plurality of subframes. This may allow the UE to conserve power by temporarily relieving it of the obligation to monitor the control channel. Specifically, in response to receiving the bDCI, the UE may forego monitoring the control channel during a period of time indicated as the blanking duration. The UE may optionally take other action in response to receiving the bDCI. For example, the UE may enter a sleep state for some or all of the blanking period, after which period the UE may wake up to continue monitoring the control channel. In other scenarios, the UE may take other action, or remain in another state, during the blanking period. For example, in some scenarios, the UE may receive communications, e.g., system information messages, during the blanking period, that are not related to DCI messages and are not communicated on the PDCCH.

In some scenarios, the blanking duration may be explicitly specified by the bDCI. For example, the bDCI may specify the blanking duration to be K subframes. In response, after receiving the bDCI at subframe n, the UE may determine that the blanking period will begin at subframe n+1, and end at subframe n+K+1. Alternatively, after receiving the bDCI at subframe n, the UE may determine that the blanking period will begin at subframe n+n0+1, and end at subframe n+n0+K+1, where n0 is an offset value known to the UE. For example, n0 may be semi-statically configured; e.g., communicated infrequently from the eNB.

In some scenarios, a pre-configured blanking duration may be sent to UE semantically, e.g., {K1, K2, . . . , KN}. In the bDCI, an index may be signaled, so that the UE knows the blanking duration via the indexing. For example, if the bDCI includes index i, then the UE may determine that the blanking duration is Ki. Thus, if the UE receives the bDCI at subframe n, then the UE may determine that the blanking period will begin at subframe n+1, and end at subframe n+Ki+1. As in the preceding example, the UE may alternatively receive the bDCI at subframe n, and determine that the blanking duration will begin at subframe n+n0+1, and end at subframe n+Ki+n0+1, where n0 is an offset value, e.g., semi-statically configured. Utilizing an index to communicate the blanking duration may allow the blanking duration to be communicated with a smaller bit field in the bDCI. However, this may come at a cost in flexibility, as, in some scenarios, the set of indexed values may not include all possible blanking duration values. A set of index values (e.g., {K1, K2, ..., KN}), or some subset thereof, may be sent to the UE semi-statically or at a specified time, such as upon connection to the network.

In some scenarios, the bDCI may not include an indication of a blanking duration. Instead, the blanking duration may be pre-configured, e.g., semi-statically. For example, after receiving bDCI at subframe n, the UE may determine that the blanking period will begin at subframe n+1, and end at subframe n+K0+1. In some scenarios, the blanking duration K0 may be a value determined based on another system configuration parameter (e.g., transmission mode) via a look-up table. This variation may allow an even smaller bDCI (e.g., a one-bit blanking instruction) than the indexing variation. However, the blanking duration would be (at least semi-statically) fixed.

In some scenarios, the UE may terminate the blanking period before the expiration of the blanking duration indicated by the bDCI. For example, the UE may prematurely terminate the blanking period by transmitting an UL message to the base station. Specifically, in some scenarios, such an UL message may indicate to the base station that the UE is no longer taking advantage of the blanking period, e.g., by remaining in a sleep state, and the base station may therefore resume transmitting DCIs and/or other communications to the UE. In other scenarios, the UE may transmit at least certain UL messages without terminating the blanking period.

Improved Control Channel for C-DRX

The UE may also receive a bDCI while configured in C-DRX mode (e.g., as defined by LTE-A or other applicable standards promulgated by 3GPP or other standards bodies), which may utilize parameters such as onDuration, inactivityTimer, etc.

For example, in response to determining that there is no DCI to be transmitted for the UE during the remainder of the time defined by a parameter such as onDuration or inactivityTimer, the eNB may send a bDCI to the UE. The bDCI may be configured to communicate a blanking duration according to an explicit indication, an index value, and/or a predetermined offset, e.g., according to any of the preceding examples. For example, a predetermined offset may be derived from C-DRX configuration parameters, e.g., via table look up.

In some scenarios, the bDCI may not signal a blanking duration, and the UE may determine that the blanking period will end at the start of the next onDuration.

Various options may be selected to reconcile the blanking duration with the sleep periods defined by the C-DRX mode. This may be especially relevant in (but not limited to) scenarios where the UE enters a sleep state for the entire blanking period. For example, if the blanking duration indicated by a bDCI is specified such that it would extend beyond the start of the next onDuration, or such that it would extend to a time within M subframes of the next onDuration, then the UE may determine that the blanking period will end at the start of the next onDuration, effectively causing the sleep/wake periods of the C-DRX mode to take precedence over the blanking duration specified by the bDCI. Alternatively, in such a scenario, the UE may determine that the blanking period will continue throughout the specified blanking duration, and end after the specified blanking duration ends, effectively causing the blanking duration specified by the bDCI to take precedence over the sleep/wake periods of the C-DRX mode. The value M may be either semi-statically configured or fixed.

As noted above, in some scenarios, the UE may also terminate the blanking period prior to expiration of the blanking duration indicated by a bDCI by other means, such as by transmitting an UL message.

bDCI Monitoring

In some scenarios, bDCI may be transmitted periodically, e.g., on a semi-statically configured time-frequency domain pattern, which may include at least one of the following: Periodicity T, Time-domain offset $T_{offset}$, and/or Frequency hopping pattern. The UE may be expected to receive bDCI only at the configured frequency and time of bDCI monitoring. The periodicity may be adapted to a UE traffic pattern (e.g., UE-specific) and/or eNB load. In such scenarios, the UE may not monitor bDCI every subframe (e.g., 10 ms, 20 ms, etc.), as such frequent monitoring may be power costly. Thus, to save power, the periodicity may be configured such that the UE is expected to receive bDCI less frequently that every subframe. In some scenarios, the bDCI periodicity may be more frequent than the C-DRX periodicity.

In some scenarios, the bDCI may be transmitted via MAC control element (CE).

In some scenarios, the bDCI may be sent to each UE separately in a unicast way. Alternatively, the bDCI may be sent in the physical resources that are dedicated to a group of UEs. If the bDCI is sent in the physical resources dedicated to a group of UEs ("group bDCI indication"), the eNB may group the UEs, e.g., based on latency requirements, pending packet size, traffic types, and/or other criteria. The eNB may then send bDCI to corresponding groups with the periodicity defined accordingly. This may further reduce the resource usage for supporting bDCI while meeting the service requirements for different traffic types.

In some scenarios, the bDCI may be either a new DCI format or a part of another DCI format, and may be monitored during regular DCI monitoring. In such scenarios, whenever bDCI is detected, the UE may utilize the blanking period specified by the bDCI, e.g., by responding in any of the manners outlined above.

As one example, the bDCI may be a part of a scheduling DCI having a bandwidth part (BWP) selection field. A BWP is an identified set of frequency and time resources. For example, a BWP may be identified as a contiguous set of frequency resources with an associated time periodicity. A UE can be configured with multiple BWPs via RRC, and at one point of time a subset of BWPs may be active. The eNB may expect the UE to monitor active BWP(s). The active BWP(s) may be changed explicitly via DCI. For example, a scheduling DCI may include a bit field (e.g., 2-3 bits) for selecting BWP. One example use case for changing the active BWP is to allow a UE to monitor a BWP with small bandwidth and long periodicity when there is light or no traffic, but to cause the UE to switch to another BWP with larger bandwidth and/or shorter periodicity when heavier traffic occurs.

In some scenarios, one or more values of a BWP selection bit field of a scheduling DCI may be reserved as a bDCI flag. For example, when any of these one or more bDCI values is indicated by the BWP selection bit field, the UE may interpret the DCI as a bDCI, e.g., with a preconfigured blanking duration, as discussed above.

In some scenarios, the BWP selection may remain unchanged when such a bDCI value is detected within the BWP selection bit field, such that, following expiration of the blanking period, the UE may resume monitoring the previously configured active BWP. For example, the BWP selection bit field may have possible values as defined in Table 1. In the example of Table 1, the BWP selection bit field is illustrated as a 2-bit field, although other field lengths and/or value assignments are, of course, envisioned. BWP configuration settings for possible values of the BWP selection bit field may be provided in advance, e.g., semi-statically through RRC signaling. As illustrated, if the BWP selection bit field has a value of "00", then the BWP may be configured with a BWP configuration index of 0 (specifying a predefined frequency set) and a BWP periodicity of 2 (specifying that the UE will monitor the specified frequency set every second slot; i.e., once per subframe). Similarly, a BWP selection bit field having a value of "01" may indicate a BWP configuration index of 4 (specifying a distinct predetermined frequency set) and a BWP periodicity of 8 (specifying that the UE will monitor the specified frequency set every eighth slot). Similarly, a BWP selection bit field having a value of "10" may indicate a BWP configuration index of 8 (specifying a distinct predetermined frequency set) and a BWP periodicity of 16 (specifying that the UE will monitor the specified frequency set every sixteenth slot). By contrast, a BWP selection bit field having a value of "11" may cause the UE to treat the DCI as a bDCI. According to the present example, the BWP selection may remain unchanged. Thus, as shown in the example of Table 1, the BWP configuration index and BWP periodicity may be unspecified or ignored.

TABLE 1

| Bit-field (2 bits) | '00' | '01' | '10' | '11' |
|---|---|---|---|---|
| BWP config index | 0 | 4 | 8 | bDCI |
| BWP periodicity (slot) | 2 | 8 | 16 | bDCI |

In some scenarios, the UE may change BWP selection in response to detecting a bDCI value within the BWP selection field, such that, following expiration of the blanking period, the UE may monitor a different BWP than before receiving the bDCI. As a first example, following expiration of the blanking period, the UE may monitor a default BWP configuration (e.g., having a small bandwidth). For example, the UE may be configured with a default BWP configuration, e.g., on startup. Thus, as in the previous example (and as illustrated in Table 1), the BWP configuration index and BWP periodicity may be unspecified or ignored when the bit field value is "11" (or any other bDCI value).

As a second example of changing BWP selection, following expiration of the blanking period, the UE may monitor a new specified BWP configuration. This example is illustrated in Table 2, wherein a BWP bit field value of "11" may again cause the UE to treat the DCI as a bDCI, but wherein the BWP bit field value of "11" further indicates a new BWP configuration index of 16 and a default BWP periodicity of 16. As noted above, the configuration settings of Table 2 may be provided in advance, e.g., semi-statically through RRC signaling.

TABLE 2

| Bit-field (2 bits) | '00' | '01' | '10' | '11' |
|---|---|---|---|---|
| BWP config index | 0 | 4 | 8 | 16 |
| BWP periodicity (slot) | 2 | 8 | 16 | 16 |

In other scenarios (e.g., where the BWP selection bit field is more than 2 bits), multiple values of the BWP selection bit field may serve as bDCI values, but may indicate different BWP configuration settings. In some scenarios, at least one value of the BWP selection bit field may indicate a new BWP configuration, as in the example of Table 2, while at least one other value of the BWP selection bit field may indicate that the BWP selection should remain unchanged, as in the example of Table 1.

In any of the above scenarios, the BWP monitoring timeline may not be affected by this BWP blanking, except that the UE may not monitor the BWP during the blanking period. Alternatively, in any of the above scenarios, the BWP monitoring timeline may be affected by BWP blanking. For example, the UE may pause a periodicity count during the blanked period, such that the blanked slots are not counted in the current period.

In response to receiving a BWP selection DCI containing a bDCI value together with a valid DL/UL grant, the UE may begin a blanking period during the slot or subframe of the grant. Alternatively, the UE may begin the blanking period during the slot or subframe following the grant, or following an offset time (e.g., n0), as outlined above. As another alternative, in response to receiving a BWP selection DCI containing a bDCI value (regardless of whether a valid grant is received) the UE may begin a blanking period in the current time slot or subframe (the slot in which the DCI is received). Alternatively, the UE may begin a blanking period in the next time slot or subframe following receipt of the DCI, or following an offset time.

Figure 5:
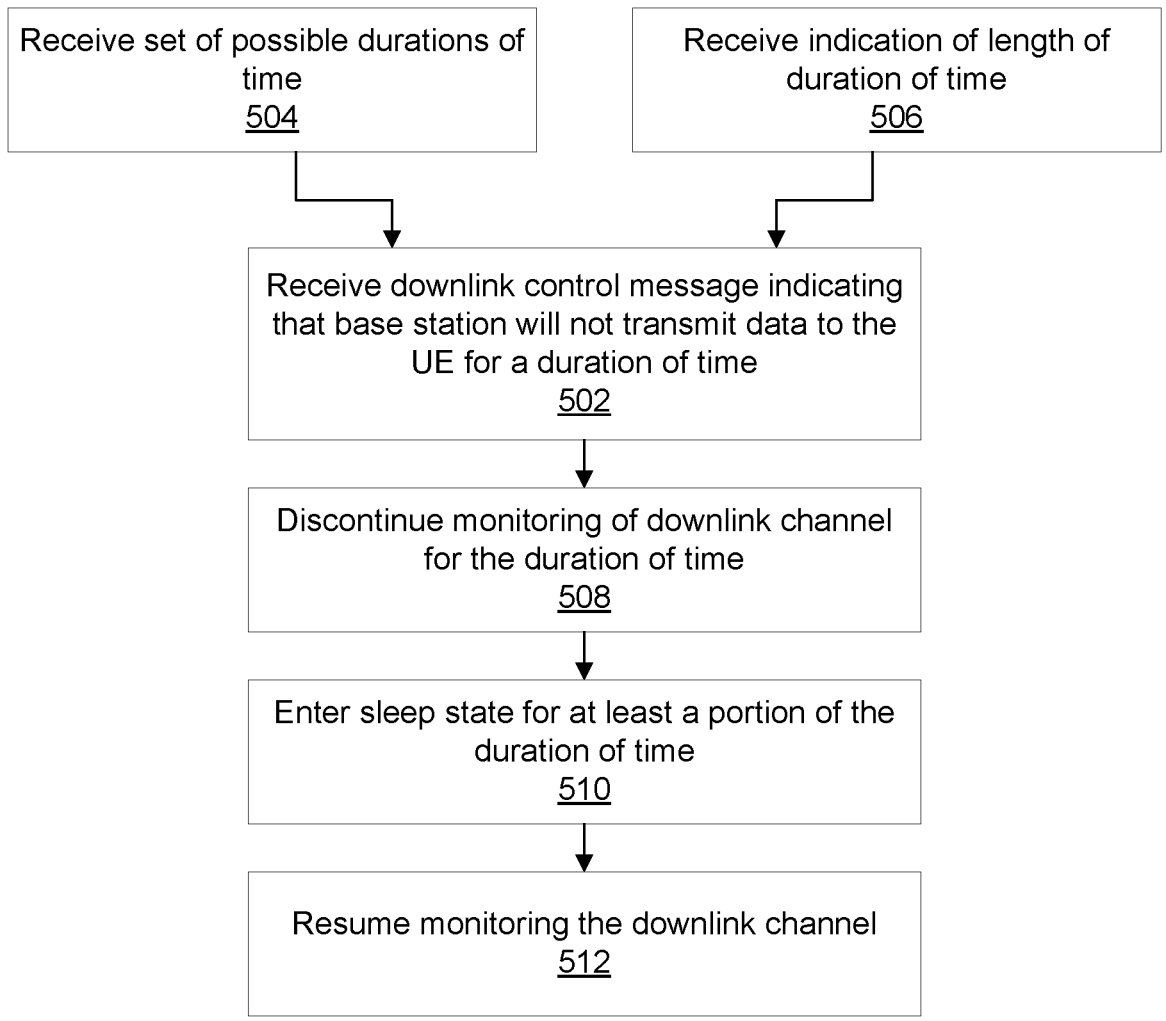
FIG. 5 is a flow diagram illustrating an example method for controlling downlink monitoring, according to some embodiments.

FIG. 5—Flow Diagram

FIG. 5 shows a flow diagram illustrating a method for controlling downlink monitoring. The operations of FIG. 5 may be performed by a UE, such as the UE 106.

At 502, the UE 106 may receive, on a downlink channel, a downlink control message (e.g., a bDCI) from a base station, the downlink control message indicating that the base station will not transmit a subsequent downlink control message, and/or communications associated with a downlink control message, to the UE 106 for a duration of time. In some scenarios, the duration of time may be constrained to be greater than one subframe. In some scenarios, the UE 106 may receive the downlink control message while operating according to a continuous reception mode. In other scenarios, the UE 106 may receive the downlink control message while operating according to a C-DRX mode.

The downlink control message may be provided, e.g., according to any of the formats disclosed above. For example, the downlink control message may be included in a DCI message, e.g., where the downlink channel is a PDCCH. More specifically, in some scenarios, the downlink control message may be included in a BWP selection field of the DCI message. In such scenarios, the downlink control message may further indicate a BWP configuration to be used by the UE 106 upon resuming monitoring of the downlink channel. In some scenarios, a current BWP period may be paused during the duration of time, such that slots occurring during the duration of time are not counted in the current BWP period.

In other scenarios, the downlink control message may be received in physical resources dedicated to a plurality of UEs, the plurality comprising the UE 106. The downlink control message may indicate that the base station will not transmit DCIs or associated data to any of the UEs in the plurality of UEs for the duration of time.

The downlink control message may indicate the duration of time in any of a number of different ways. For example, the downlink control message may include a field explicitly indicating the duration of time. Specifically, the field may explicitly indicate a number of subframes (or other units of time) for which the duration of time will last. As another example, the downlink control message may include an index identifying a value in a predetermined set of possible durations of time. In some scenarios, the UE 106 may, at optional step 504, receive the set of possible durations of time (e.g., as a list, vector, or matrix) at some point prior to receiving the downlink control message. For example, the UE may receive the set of possible durations of time from the base station during initial connection.

As another example, the downlink control message may indicate the start of the duration of time, but may not expressly indicate the length of the duration of time. For example, the length of the duration of time may be known to the UE prior to receiving the downlink control message. In some scenarios, the UE 106 may, at optional step 506, receive an indication of the length of the duration of time at some point prior to receiving the downlink control message, such as during initial connection to the base station. Alternatively, the length of the duration of time may be determined based on other parameters. For example, if the UE is operating according to a C-DRX mode, then the duration of time may last until the start of the next C-DRX on cycle; e.g., until the start of the first C-DRX on cycle following the start of the duration of time, or the start of the of the first C-DRX on cycle following reception of the downlink control message.

At 508, the UE 106 may discontinue monitoring of the downlink channel for the duration of time. The discontinuing monitoring may be in response to receiving the downlink control message. Thus, the UE 106 may not receive notification of DL or UL grants (e.g., subsequent downlink control messages) from the base station, or other notifications on the downlink channel, during the duration of time. Because the base station sent the downlink control message, the base station is aware that the UE 106 may discontinue monitoring of the downlink channel for the duration of time, and the base station may therefore forego sending any grants or other communications to the UE 106 over the downlink channel during the duration of time.

At 510, the UE 106 may enter a sleep state (or other power-saving state) for at least a portion of the duration of time, at least partially in response to receiving the downlink control message. In some scenarios, entering the sleep state may include powering down, or otherwise deactivating, certain hardware elements, such as some or all of the wireless communication circuitry 330. In some scenarios, the details of the sleep state may be as defined by an industry standard, such as a relevant LTE standard.

In some scenarios, steps 508 and 510 may not be distinct steps. For example, the UE 106 may discontinue monitoring of the downlink channel by entering the sleep state for the duration of time. In other scenarios, steps 508 and 510 may be distinct steps. For example, the UE 106 may first discontinue monitoring of the downlink channel, according to step 508, e.g., while performing other actions, and then, at some later time during the duration of time, may enter a sleep state for a portion (e.g., the remainder) of the duration of time, according to step 510. In some scenarios, the UE 106 may skip step 510, and not enter the sleep state.

In some scenarios, the UE 106 may transmit one or more UL messages during the duration of time, despite the UE 106 having discontinued monitoring of the downlink channel for the duration of time. For example, the UE 106 may transmit at least one of a scheduling request (SR), a buffer status report (BSR), an UL ACK/NACK report, and/or a CQI report. In some scenarios, transmission of such UL messages by the UE 106 may be unaffected by the during the duration of time. E.g., the UE 106 may transmit such UL messages during the duration of time, in the same manner as if the downlink control message had not been received. In other scenarios, the UE 106 may suspend transmission of UL messages for the duration of time.

At 512, the UE 106 may resume monitoring the downlink channel. If the UE 106 has entered the sleep state, according to step 510, then resuming monitoring the downlink channel may include exiting the sleep state, e.g., by entering an active state, powering on or otherwise activating hardware elements, etc.

In some scenarios, the UE 106 may resume monitoring the downlink channel at 512 in response to expiration of the duration of time. In some scenarios, the UE 106 may begin preparations to resume monitoring (e.g., may begin powering on hardware elements) sufficiently prior to expiration of the duration of time, so as to be ready to resume monitoring the downlink channel promptly upon expiration of the duration of time.

In some scenarios, the UE 106 may resume monitoring the downlink channel at 512 in response to the UE 106 transmitting an UL message. For example, in some scenarios, transmission of an UL message by the UE 106 may interrupt the duration of time. In such scenarios, the base station may terminate, invalidate, or otherwise interrupt a blanking period corresponding to the duration of time in response to receiving an UL message from the UE 106. Thus, despite the duration of time indicated by the downlink control message, the base station may resume transmitting data to the UE 106 prior to expiration of the duration of time, in response to receiving an UL message from the UE 106.

It should be understood that various operations of the method illustrated in FIG. 5 may be performed concurrently, in a different order than shown, or omitted, and other operations may be added. For example, some embodiments of the method may exclude various combinations of operations 504, 506, and/or 510.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106 or any one or more of the servers or systems illustrated in any of the

The invention claimed is:

1. A base station in a wireless communication network, the base station comprising:
   wireless communication circuitry configured to communicate with a user equipment device (UE);
   processor circuitry configured to cause the base station to:
   transmit, to the UE, via the wireless communication circuitry, on a downlink channel of a first bandwidth part (BWP), a downlink control message indicating a duration of time in which the base station will not expect the UE to perform uplink or downlink communications, wherein the downlink control message includes an indication for the UE to monitor a downlink channel of a second BWP after the duration of time, the second BWP being different than the first BWP; and
   resume communications with the UE, via the wireless communication circuitry, on the second BWP after the duration of time, wherein no communication is performed with the UE on the first BWP during the duration of time.

2. The base station of claim 1, wherein the downlink control message explicitly indicates a number of subframes or a number of slots for which the duration of time will last.

3. The base station of claim 1, wherein the downlink control message comprises an index identifying a value in a predetermined set of possible durations of time.

4. The base station of claim 1, wherein the downlink control message includes a downlink or uplink grant.

5. The base station of claim 1, wherein the duration of time in which the base station will not expect the UE to perform uplink or downlink communications begins in the time slot in which the downlink control message is received.

6. The base station of claim 1, wherein the duration of time in which the base station will not expect the UE to perform uplink or downlink communications begins in the time slot immediately following the time slot in which the downlink control message is received.

7. The base station of claim 1, wherein the downlink channel is a Physical Downlink Control Channel (PDCCH) and wherein the downlink control message is comprised in Downlink Control Information (DCI).

8. The base station of claim 1, wherein the processor circuitry is further configured to cause the base station to:
   enter a sleep state for at least a portion of the duration of time, in response to receiving the downlink control message.

9. A non-transitory computer-readable medium storing software instructions executable by a processor of a base station to cause the base station to:
   transmit, to a user equipment device (UE), on a downlink channel of a first bandwidth part (BWP), a downlink control message indicating a duration of time in which the base station will not expect the UE to perform uplink or downlink communications, wherein the downlink control message includes an indication for the UE to monitor a downlink channel of a second BWP after the duration of time, the second BWP being different than the first BWP; and
   resume communications with the UE on the second BWP after the duration of time, wherein no communication is performed with the UE on the first BWP during the duration of time.

10. The non-transitory computer-readable medium of claim 9, wherein the downlink control message explicitly indicates a number of subframes or a number of slots for which the duration of time will last.

11. The non-transitory computer-readable medium of claim 9, wherein the downlink control message comprises an index identifying a value in a predetermined set of possible durations of time.

12. The non-transitory computer-readable medium of claim 9, wherein the downlink control message includes a downlink or uplink grant.

13. The non-transitory computer-readable medium of claim 9, wherein the duration of time in which the base station will not expect the UE to perform uplink or downlink communications begins in the time slot in which the downlink control message is received.

14. The non-transitory computer-readable medium of claim 9, wherein the duration of time in which the base station will not expect the UE to perform uplink or downlink communications begins in the time slot immediately following the time slot in which the downlink control message is received.

15. The non-transitory computer-readable medium of claim 9, wherein the downlink channel is a Physical Downlink Control Channel (PDCCH) and wherein the downlink control message is comprised in Downlink Control Information (DCI).

16. The non-transitory computer-readable medium of claim 9, wherein the software instructions are further executable to cause the base station to:
   enter a sleep state for at least a portion of the duration of time, in response to receiving the downlink control message.

17. A method for controlling downlink monitoring, the method comprising:
   by a base station:
   transmitting, to a user equipment device (UE), on a downlink channel of a first bandwidth part (BWP), a downlink control message indicating a duration of time in which the base station will not expect the UE to perform uplink or downlink communications, wherein the downlink control message includes an indication for the UE to monitor a downlink channel of a second BWP after the duration of time, the second BWP being different than the first BWP; and
   resuming communications with the UE on the second BWP after the duration of time, wherein no communication is performed with the UE on the first BWP during the duration of time.

18. The method of claim 17, wherein the downlink control message includes a downlink or uplink grant.

19. The method of claim 17, wherein the downlink channel is a Physical Downlink Control Channel (PDCCH)

and wherein the downlink control message is comprised in Downlink Control Information (DCI).

20. The method of claim 17, further comprising:
   entering a sleep state for at least a portion of the duration of time, in response to receiving the downlink control message.

\* \* \* \* \*